UNITED STATES PATENT OFFICE 2,442,027

3,4-DIHYDROXYTHIOPHENE-2-KETO-BUTYRIC ACID

Stockton Graeme Turnbull, Jr., Wilmington, Del., assignor to E. I. du Pont de Nemours & Company, Wilmington, Del., a corporation of Delaware No Drawing. Application February 25, 1944, Serial No. 523,916

1 Claim. (Cl. 260—329)

This invention pertains to new and useful thiophene derivatives and more particularly refers to compounds having the following general formula:

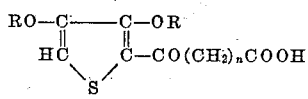

wherein R represents hydrogen, a hydrocarbon radical or an acyl group, and $n$ represents the integer 2 or 3; and processes for their production.

Heretofore certain derivatives of thiophene have been prepared by condensing thiophene itself with certain acid anhydrides. However, so far as shown, none of these derivatives conformed to the foregoing formula. Prior art reactions of this type are described in Fieser—J. A. C. S. 57 1615 (1935), and du Vigneaud et al.—Science 96 455 (1942).

It is an object of this invention to produce new thiophene derivatives which are particularly adapted for use in the manufacture of pharmaceuticals. An additional object is to produce these compounds by simple and efficient processes. Additional objects will become apparent from a consideration of the following description and claims.

These objects are obtained in accordance with the present invention wherein compounds conforming to the following general formula are produced:

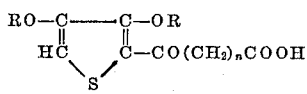

wherein R represents hydrogen, a hydrocarbon radical or an acyl group, and $n$ represents the integer 2 or 3. In a more restricted sense this invention is concerned with compounds such as the 3,4-dihydroxythiophene-2-keto-butyric acid, the 3,4-dimethoxythiophene-2-keto-butyric acid, and the 3,4-dibenzoxythiophene-2-keto-butyric acid. Another embodiment of this invention pertains to processes for the production of the foregoing compounds wherein ethers and esters of 3,4-dihydroxythiophenes are reacted with succinic anhydride or glutaric anhydride in the presence of a Friedel-Crafts reagent.

The invention may be more readily understood by a consideration of the following illustrative examples wherein the quantities are stated in parts by weight:

EXAMPLE 1

*3,4-dimethoxythiophene-2-ketobutyric acid*

6.1 parts of the 3,4-dimethoxythiophene and 4.9 parts of glutaric anhydride were dissolved in 90 parts of nitrobenzene and the solution was cooled to 5° C. With agitation 13.3 parts of aluminum chloride was added in four equal portions at 15-minute intervals. Each addition caused a temperature rise to 10° C. The initial yellow solution went through a series of color changes from a light to a deep red and finally became a blue-green after an hour.

After agitation between 5–25° C. for 16 hours 50 parts of ice was added, followed by 200 parts of dilute HCl. The nitrobenzene was removed by steam distillation and the aqueous layer was extracted with 1200 parts of ether. Extraction with dilute caustic containing some sodium hydrosulfite left 0.3 g. of caustic-insoluble yellow oil in the ether.

Acidification of the combined caustic extracts gave 5.5 g. of a red-brown oil which was very soluble in acetone, quite soluble in acetic acid and only partially soluble in benzene. It crystallized on standing. By crystallization from ethylene dichloride followed by two crystallizations from ethanol the 3,4-dimethoxythiophene-2-ketobutyric acid that melted clear at 172–174° C. was obtained. It crystallized partially hydrated, as indicated by analysis.

EXAMPLE 2

*3,4-dibenzoxythiophene-2-ketobutyric acid*

To an agitated solution of 6.5 parts of 3,4-dibenzoxythiophene and 2.4 parts of glutaric anhydride in 180 parts of nitrobenzene there was added in four equal portions at 5–6° C. over the period of an hour, 3.33 parts of powdered aluminum chloride. With each addition there was a slight temperature rise. After 16 hours agitation the mixture was poured into iced dilute hydrochloric acid. The nitrobenzene was removed by steam-distillation and the product was processed through ether to get 7.5 parts of caustic-soluble oil, which gave gray crystals, which upon recrystallization from acetic acid and ethyl acetate became white and melted at 190–193° C. Analysis indicated this to be the 3,4-dibenzoxythiophene-2-ketobutyric acid. 3,4-dihydroxythiophene-2-ketobutyric acid may be produced by saponification of the above product.

EXAMPLE 3

When the amount of aluminum chloride used in the above Example 2 was doubled, it was found that one of the ester linkages was saponified, the result being that the 3-hydroxy-4-benzoxy-thiophene-2-ketobutyric acid, which melted at 100–102° C., was obtained. It was very soluble in acetone, methanol, ethyl acetate and pyridine, but was insoluble in ligroin, benzene and chlorbenzene.

It is to be understood that the foregoing examples are representative merely of a few of the many embodiments of this invention. They may be varied widely with respect to the individual reactants, the amounts thereof and the conditions of reaction without departing from the scope hereof.

As previously mentioned, the compounds of this invention are 3,4-dihydroxythiophenes substituted in the nucleus by keto-aliphatic side chains terminated by a carboxyl group, as well as ethers and esters thereof. These compounds may be produced by the Friedel-Crafts reaction of acid anhydrides, such as succinic and glutaric acid anhydrides with ethers and esters of dihydroxy-thiophenes. Where the 3,4-dihydroxy derivatives are desired, products produced as aforesaid may be saponified or de-etherified.

While the same group may be substituted on the 3- and 4-position of the foregoing compounds, it is to be understood that these groups may be dissimilar.

The compounds hereof are particularly adapted for use in the pharmaceutical field, especially as intermediates in the synthesis of vitamins. It is also contemplated that they may be used for a variety of other purposes, such as photographic developers, dye intermediates, metal deactivators, intermediates for the manufacture of synthetic fibres, etc.

Several other useful classes of thiophene derivatives are described and claimed in copending applications Serial Nos. 523,913, now abandoned, 523,914, and 523,915.

As many apparently widely different embodiments of this invention may be made without departing from the spirit and scope hereof, it is to be understood that the invention is not limited to the specific embodiments hereof except as defined in the appended claim.

I claim:

The 3,4-dihydroxythiophene - 2 - keto-butyric acid.

STOCKTON GRAEME TURNBULL, Jr.

REFERENCES CITED

The following references are of record in the file of this patent:

UNITED STATES PATENTS

| Number | Name | Date |
|---|---|---|
| 2,085,065 | Anderson | June 29, 1937 |
| 2,157,796 | Muth | May 9, 1939 |

OTHER REFERENCES

Karrer, Organic Chemistry (1938), page 701.
Alles, J. Pharm. and Exp. Ther. 72, No. 3 (July 1941), pages 265–275.